United States Patent [19]
Lang et al.

[11] 3,732,959
[45] May 15, 1973

[54] OVERRUNNING BAND CLUTCH ASSEMBLY WITH SELECTIVE ENGAGEMENT MEANS IN THE DRIVE DIRECTION

[75] Inventors: Ernest U. Lang; Edwin E. Mallory, both of Niles, Mich.

[73] Assignee: National-Standard Company, Niles, Mich.

[22] Filed: Aug. 30, 1971

[21] Appl. No.: 176,067

[52] U.S. Cl................192/91 A, 192/47, 192/85 AT, 192/89 A
[51] Int. Cl.............................................F16d 25/00
[58] Field of Search....................192/47, 41 S, 89 A, 192/91 A, 93 C, 81 R, 85 AT, 81 C

[56] References Cited
UNITED STATES PATENTS

| | | | |
|---|---|---|---|
| 3,466,947 | 9/1969 | Smith | 192/91 A |
| 1,940,880 | 12/1933 | Pitter | 192/41 S |
| 2,393,010 | 1/1946 | Arnold et al. | 192/85 AT |
| 2,419,913 | 4/1947 | Ormsby | 192/85 AT |
| 3,187,512 | 6/1965 | Gabriel | 192/47 X |
| 3,354,752 | 11/1967 | General | 192/47 X |
| 3,447,643 | 6/1969 | Ulbing | 192/47 |

*Primary Examiner*—Benjamin W. Wyche
*Attorney*—John A. Dienner et al.

[57] ABSTRACT

An overrunning clutch comprising drive and driven clutch members, one of which has a V-groove into which the tip ends of a plurality of interfitting and overlapping clutch bands are disposed. Engagement prevention means are used to selectively hold the clutch bands away from engagement with the V-groove as the drive clutch member is turning in the drive direction.

8 Claims, 9 Drawing Figures

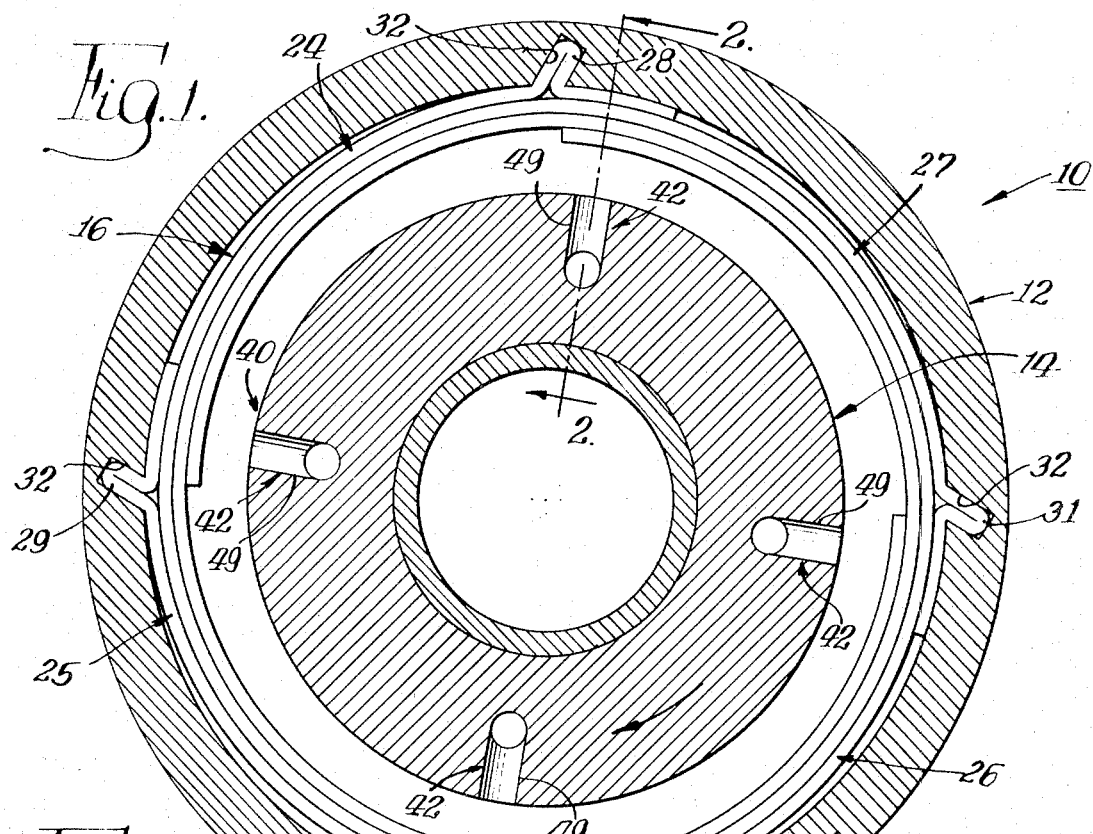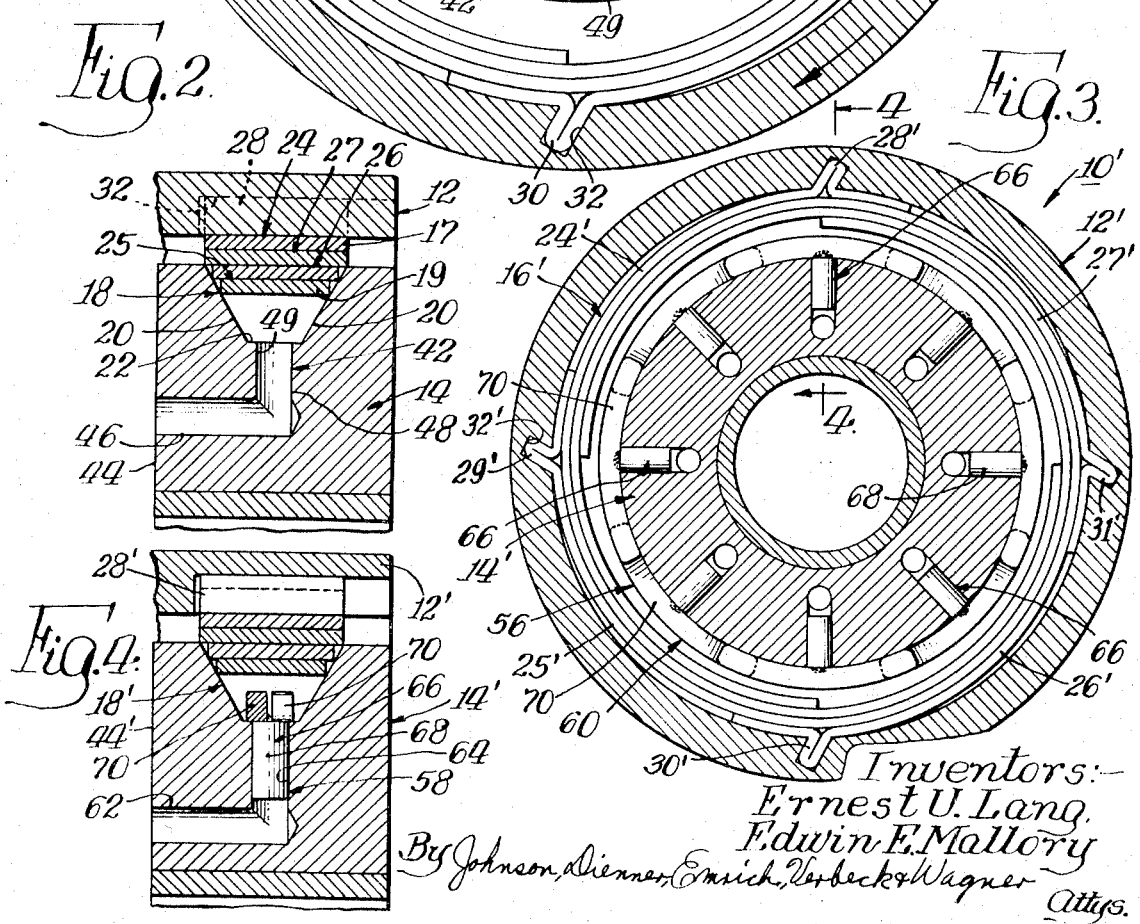

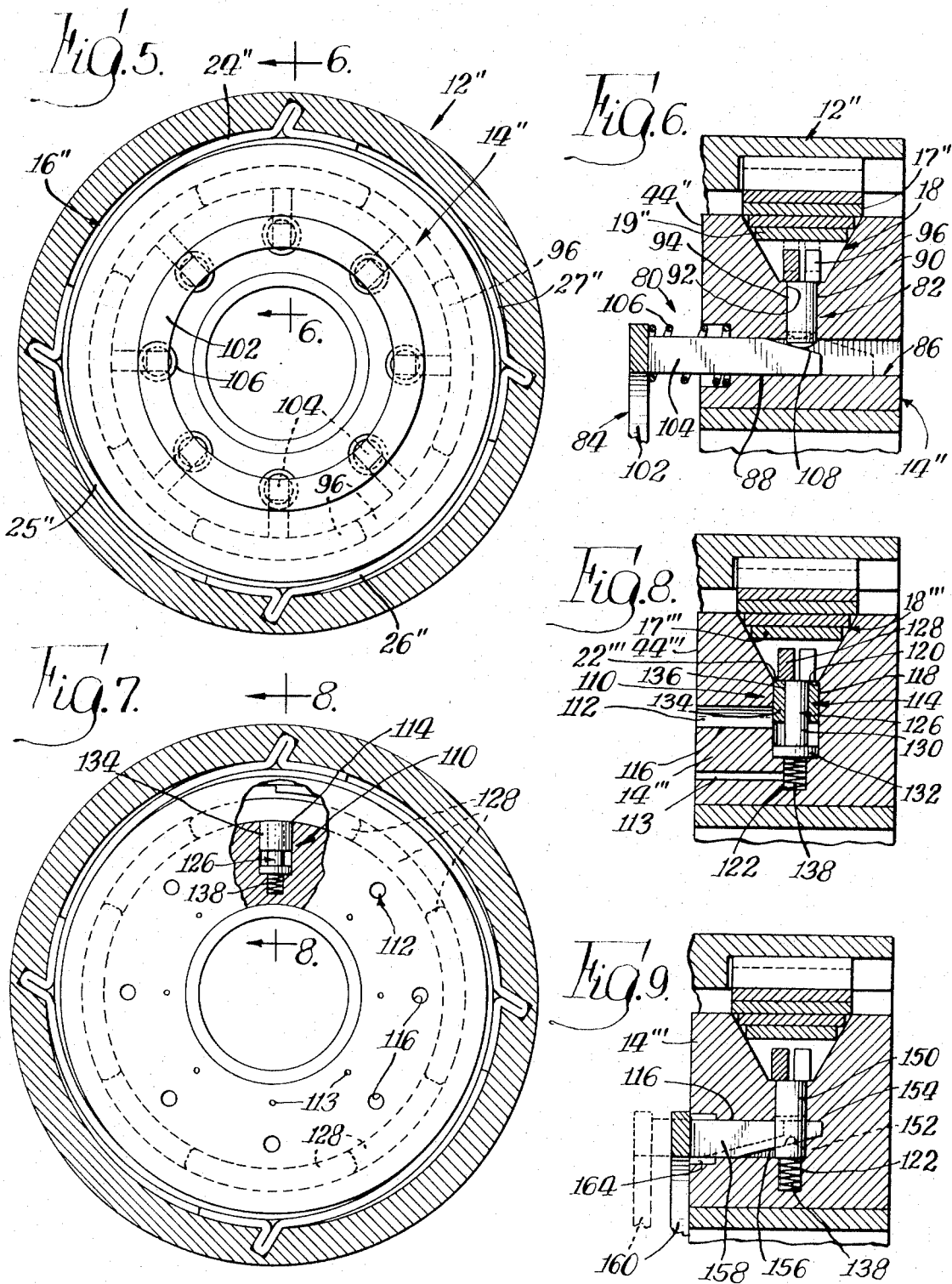

３,732,959

OVERRUNNING BAND CLUTCH ASSEMBLY WITH SELECTIVE ENGAGEMENT MEANS IN THE DRIVE DIRECTION

BACKGROUND OF THE INVENTION

The present invention relates to clutch bands for band clutches of the overrunning type.

The clutch band of this invention relates to the class of band clutch constructions disclosed in U.S. Pat. No. 2,518,453, issued Aug. 15, 1950 to J. M. Dodwell. This patent discloses a band-type, free-wheeling clutch embodying drive and driven clutch members, one of which is provided with a V-groove onto which the narrow tapered ends of a plurality of interfitting and overlapping clutch bands are disposed. The wide ends of such clutch bands are anchored to the other of such clutch members so that upon rotation of the drive member in one direction a driven member is driven in the same direction through the engagement of the side edges of the narrow tapered ends of each clutch band with the side walls of the V-groove.

In operation of the overrunning or free-wheeling type clutches, upon rotation of the drive clutch member so as to tighten the clutch bands around the V-groove, the overlying portions of the clutch bands are drawn tightly against the underlying portions of adjacent clutch bands and the side edges of the clutch bands are urged into frictional driving engagement with the side walls of the V-groove.

It is an object of this invention to provide a band clutch construction of the overrunning type having an engagement prevention means that selectively either interrupts or prevents the frictional driving engagement of the clutch bands with the side walls of the V-groove.

It is a further object of this invention to provide a band clutch construction of the overrunning type having an engagement prevention means that selectively interrupts or prevents the frictional driving engagement of the clutch bands with the side walls of the V-groove by using a radially outward direct fluid under pressure.

Another object of this invention is to provide a band clutch construction of the overrunning type having an engagement prevention means that selectively prevents or interrupts the frictional driving engagement of the clutch bands with the side walls of the V-groove by using a radially expandable clutch band disengagement member actuated by fluid under pressure.

A further object of this invention is to provide a band clutch construction of the overrunning type having an engagement prevention means that selectively prevents or interrupts the frictional driving engagement of the clutch bands with the side walls of the V-groove by using a radially expandable clutch band disengagement member actuated by a sliding mechanical means.

It is still a further object of this invention to provide a band clutch construction of the overrunning type having an engagement prevention means that selectively prevents the frictional driving engagement of the clutch bands with the side walls of the V-groove using a spring-loaded, radially expandable clutch member and released by fluid under pressure or sliding mechanical means.

These and other objects of this invention will become apparent from the following description with the aid of the attached drawing of the several embodiments of this invention.

SUMMARY OF THE INVENTION

An engagement prevention means for use in overrunning clutches selectively interrupts or prevents the clutching action of the clutch bands. The engagement prevention means provides a radially outward force on the clutch bands of sufficient magnitude to keep them from making a frictional driving engagement with the side walls of the V-groove.

DESCRIPTION OF DRAWINGS

For a better understanding of this invention, reference may be made to the accompanying drawings, in which:

FIG. 1 is a vertical sectional view of an overrunning type clutch showing one embodiment of this invention;

FIG. 2 is a sectional view taken along the line 2—2 of FIG. 1 and looking in the direction of the arrows;

FIG. 3 is a sectional view of an overrunning type clutch illustrating a second embodiment of this invention;

FIG. 4 is a sectional view taken along the line 4—4 of FIG. 3 and looking in the direction of the arrows;

FIG. 5 is an end view of an overrunning type clutch with the outer annular portion shown in section illustrating a third embodiment of this invention;

FIG. 6 is a cross-sectional view taken along the line 6—6 of FIG. 5 and looking in the direction of the arrows;

FIG. 7 is an end view of an overrunning type clutch illustrating the fourth embodiment of this invention, with a portion of the end plate broken away to illustrate a portion of the engagement prevention means and with outer annular portion shown in section;

FIG. 8 is a cross-sectional view taken along the line 8—8 of FIG. 7 and looking in the direction of the arrows; and FIG. 9 is a cross-sectional view partially showing an overrunning type clutch of the type illustrated in FIG. 7 to illustrate a modified version of the engagement prevention means depicted in FIG. 8.

FIRST EMBODIMENT

There is shown in FIG. 1, an overrunning band clutch 10 having drive and driven clutch members 12 and 14, respectively, and a clutch band assembly generally designated by the reference numeral 16. As is conventional in clutches of this type, the driven clutch member 14 is formed with a circumferentially extending V-groove 18 (FIG. 2) defined by a pair of opposed sidewalls 20 tapering inwardly towards each other and terminating into a bottom wall 22. The driven clutch member 14 is generally made of hardened steel or a similar material capable of withstanding the wedging action of the clutch band assembly 16.

The clutch band assembly comprises four identical clutch bands 24 through 27 which are positioned between the drive and driven clutch members 12 and 14 in an interfitting and overlapping arrangement. Each of the clutch bands is integrally formed as one piece structures preferably made of spring steel stock and is tapered longitudinally to define a wider end portion 17 and narrower end portion 19. Each of the clutch bands 24 through 27 is formed in a spiral configuration such that the narrow end portion or tip 19 of the bands spirals down into the V-groove 18 as illustrated in FIG. 2. The wider end portion of the clutch bands 24–27 has integrally formed a plurality of anchors 28 through 31, respectively, which fit into one of the anchor pockets 32 formed inwardly in the drive clutch member 12.

In operation of the overrunning clutch 10, upon rotation of the drive clutch member 12 in the direction of the arrows shown in FIG. 1, the overlying portions of each clutch band are drawn tightly against the underlying portions of the adjacent clutch band. As a result, the side edges of their tips are urged into frictional driving engagement with the side walls 20 of the V-groove 18.

The foregoing description of the FIG. 1 embodiment forms no part of this invention and is included only for the purpose of clearly illustrating the principles of this invention. Nor is this invention limited to use with a plurality of torque transmitting bands. One band could be effectively used if constructed to have overlapping portions in the manner disclosed in our prior U.S. Pat. No. 3,275,111, which is assigned to the same assignee as this invention.

This invention resides in an engagement prevention means that selectively provides a radially outward pressure or force on the clutch bands 24 through 27 with a sufficient magnitude to keep them from making frictional driving engagement wit the side walls of the V-groove 18 as the drive clutch member 12 turns in the drive direction (as indicated by the arrow in FIG. 1).

Referring to FIGS. 1 and 2, there is shown an engagement prevention means 40 comprising a plurality of fluid passageways 42 formed between one end face 44 of the driven clutch member 14 and bottom wall 22 of the V-groove 18. Each passageway 42 has an axial extending portion 46 and a radial extending portion 48, which form a radial opening 49 in the bottom wall 22 of V-groove 18.

In use, the clutch 10 would be encased in a fluid housing (not shown), such as a transmission housing, and the axially extending portion 46 of the fluid passageways 42 would be interconnected to a pump device by means of a fluid pressure chamber (not shown) which is in sealing engagement with the end face 44 of the driven clutch member 14, and the flow of fluid under pressure from the pump device through the passageways 42 would be controlled by a conventional valve. In operation, the fluid under pressure exits in a radial outward direction from the radial openings 49 of the radial portion of the passageways 42 with a sufficient pressure to cause the disengagement of the clutch bands 24 through 27. Since the clutch 10 is encased in a fluid housing, the fluid discharged into the V-groove 18 is readily recirculated back to the pump, in any conventionally known manner.

Although only four fluid passageways in FIG. 1 have been shown, it will be appreciated that a greater or lesser number could be used without departing from the spirit and scope of this invention. One use for this invention is to permit the disengagement of the clutch bands and thus eliminate the necessity of having a regular clutch in series with the overrunning clutch when the drive train dictates such requirements. It will be appreciated that the function of providing a selective interruption of the frictional driving engagement between the tips of the clutch bands with the side walls of the V-groove could be used for a number of other applications.

SECOND EMBODIMENT

Referring to FIGS. 3 and 4, there is illustrated a second embodiment of this invention. The drive and driven clutch members and the band clutch assembly shown in FIG. 3 are identical to those of FIG. 1 and like parts are identified with a prime number.

The engagement prevention means 56 of the second embodiment performs the same function as the engagement prevention means 40 of the first embodiment, but differs structurally from the first embodiment. In the first embodiment, the slip clutch means was provided by a fluid pressure means directed radially outwardly against the tips of the clutch bands. Whereas, in the second embodiment the engagement prevention means 56 comprises a fluid-to-mechanical means having a plurality of passageways 58 formed in the driven clutch member 14' and a clutch band displacement device 60. The passageways 58 are quite similar in construction to the passageways 42 of the first embodiment. Each passageway comprises an axially extending portion 62 formed inwardly of the end wall 44' of driven member 14' and a radially extending portion 64, which is in communication with the V-groove 18'.

The clutch band displacement device 60 comprises a plurality of plungers 66, which are constructed as pistons 68, slidably mounted in the radial portion 64 of the passageways 58 and a plurality of arcuate segments 70 which extend circumferentially about a portion of the driven clutch member 14' and which are secured to the piston 68 at its approximate midpoint in a crosswise relation. Adjacent arcuate segments 70 are disposed in a staggered interdigitated relation (see FIG. 4) and their end portions overlap with adjacent segments to form a continuous circumferential surface. This continuous circumferential surface, which is provided when the clutch band displacement device 60 is in the extended position, causes the clutch bands to be continuously held out of clutching engagement with the side walls of the V-groove 18'.

The plurality of fluid passageways 58 are interconnected to a pump device (not shown) by means of a fluid pressure chamber (not shown) which is in sealing engagement with the end face 44' of driven clutch member 14', and a conventional valve (not shown) is employed to selectively allow fluid under pressure to enter the passageways 58 for ejecting the plungers 66 radially outwardly and to thereafter bleed the passageway, allowing the plungers to return to their retracted positions.

THIRD EMBODIMENT

Referring to FIGS. 5 and 6, there is illustrated a third embodiment of this invention. Since the drive and driven clutch members and the band clutch assembly shown in FIGS. 5 and 6 are identical to the first two embodiments, like parts will be identified by a double prime number.

The engagement prevention means 80 of the third embodiment performs the same function as the engagement prevention means in the first two described embodiments but is structurally quite different from both of the previously disclosed engagement prevention means. This embodiment fundamentally differs from the first two embodiments in that the engagement prevention means is not responsive to a fluid pressure system.

The engagement prevention means 80 has a clutch band displacement device 82 which is substantially identical to the clutch band displacement device 60 of the second embodiment. The clutch band displacement device 82 is adapted to be mechanically actuated by actuator device 84 by means of a plurality of passageways 86 formed in the driven clutch member 14''. The passageways 86 are equally spaced about the center of the driven clutch member 14'' and comprise an axially extending portion 88 formed inwardly of the end wall 44'' of the driven member 14'' and a radially extending portion 90, which terminates in the bottom wall 22'' of the V-groove 18'' to define a radial opening 92 therein.

The clutch band displacement device 82 comprises a plurality of plungers 94 slidably mounted in the radial portion 90 of the passageway 86 and an arcuate segment 96 extending circumferentially about a portion of the driven clutch member 14'' and secured to the outer end of plunger 94 in a crosswise relation. Adjacent arcuate segments 96 are disposed in a staggered interdigitated relation and their opposite end portions overlap with the adjacent arcuate segments to form a continuous circumferential surface. The purpose of this continuous circumferential surface is to provide a continuous bearing surface for the tips of the clutch band to slide along when the plungers 94 are in the extended position so that the bands will be held out of driving engagement with the side walls of the V-groove 18''.

The actuator device 84 comprises an actuator plate in the form of a pusher ring 102 on which are mounted in a perpendicular relation a plurality of cam fingers 104 adjacent its outer peripheral edge. The cam fingers 104 have their outer ends slidably positioned in the axial portion 92 of the passageways 86. The pusher ring 102 is supported (not shown) in a non-rotating relation with respect to the driven clutch member 14'' and is adapted to move axially towards and away from driven clutch member 14''. The pusher ring 102 is normally biased away from the driven clutch member 14'' by virtue of a spring means 106 disposed about each of the cam fingers 104.

The outer ends of the cam fingers 104 are provided with cam surfaces 108. The inner end of the plungers 94, which are slightly rounded, are adapted to bear against the cam surfaces 108. It will be appreciated that when the pusher ring 102 is displaced to the right as shown in FIG. 6, the inward movement of the cam fingers 104 causes the plungers 94 to move in a radial outward direction with the result that the arcuate segments 96 move the tips 19'' of the clutch bands a sufficient distance to prevent any clutching engagement with the side wall of the V-groove 18''. When the displacement force is removed, the pusher ring 102 returns under the biasing action of spring 106 to its resting position (solid line in FIG. 6) and then allows the clutch bands to make a driving engagement with the side walls if sufficient torque is still being applied to the drive members 12'' in the driving direction.

FOURTH EMBODIMENT

There is illustrated in FIGS. 7 and 8 the fourth embodiment of this invention. The drive and driven clutch members and band clutch assembly shown in FIGS. 7 and 8 are the same as shown in the first three embodiments and form no part of this invention. Consequently, like parts are identified by a triple prime number.

The fourth embodiment performs the opposite function of the first three described embodiments in that it operates to normally disengage the clutch bands from driving engagement with the side walls of the V-groove, and when selectively actuated frees the clutch bands to make driving engagement with the V-groove.

The engagement prevention means 110 of the fourth embodiment is a fluid-to-mechanical structural arrangement comprising a plurality of passageways 112 formed in the driven clutch member 14''' and a clutch band displacement device 114. Each passageway comprises an axially extending portion 116 formed inwardly of the end wall 44''' and a radially extending portion 118, which terminates in the bottom wall 22''' of the V-groove 18''' to define a radial opening 120 therein. The radially extending portions 118 differ from the second embodiment in that a recess 122 is formed inwardly and concentric with the radially extending portion 118 for purposes to be described hereafter.

The clutch band displacement device 114 comprises a plurality of plungers 126 slidably mounted in the radial portion 118 of the passageways 112, and a plurality of arcuate segments 128 extending circumferentially about a portion of the driven clutch member 14''' which are secured crosswise to the outer ends of the plungers 126. As was true in the three previously described embodiments, adjacent arcuate segments 128 are disposed in a staggered interdigitated relation (FIG. 8) and their end portions overlap with adjacent segments to form a contiguous circumferential surface.

First force means for holding the band in normally disengaged position comprises the aforementioned plungers 126 each of which is constructed from a pin 130 having a head 132. Prior to attaching arcuate segment 128 cylindrical sleeve 134 is slipped over pin 130. Compression spring 138 is then located in recess 122 and cylindrical sleeve 134 is firmly pressed into radially extending portion 118. Spring 138 normally biases displacement device 114 radially outward to prevent engagement of the clutch bands. Second force means comprising head 132 which acts as a hydraulic piston to compress spring 138 as pressurized fluid is introduced via passageways 112 thus permitting the clutch bands to engage the side walls of the V-groove 18'''. The plurality of fluid passageways 112 are interconnected to a pump device (not shown) by means of a fluid pressure chamber (not shown), which is in sealing engagement with the end face 44''' of the driven clutch member 14''', and a conventional valve (not shown) is used to selectively allow fluid under pressure to enter the passageways 112 and to thereafter bleed therefrom. Passageway 113 vents opposite side of piston to avoid back pressure or vacuum.

There is shown in FIG. 9, another form of first force means of engagement prevention means that operates to normally disengage the clutch bands from having a driving engagement with the V-groove. In FIG. 9 plunger 150 is biased radially outward by compression spring 138 just as the plunger is in FIG. 8. Plunger 150 is retracted, however second force means to overcome the first force means defined, by cam surface 156 of actuator finger 158 as it moves inwardly of the axial portion 116 of the passageway 112. Plunger 150 has a slot transverse to its longitudinal axis the bottom of which has mating cam surface 152 with which cam surface 156 cooperates.

Actuator fingers 158 are attached to pusher ring 160 which is forced inwardly by cam followers (not shown) and returned outwardly by spring 164. The actuating fingers 158 when moved inwardly of the axial portion 116 engage the cam surfaces 156 and push the plungers 150 radially inward as pusher ring 160 moves towards the driven clutch member 14′′′ to move the arcuate segments inwardly. When the pusher ring 160 returns to the dotted position shown in FIG. 9, the spring 138 in recess 122 returns the plunger 150 to its normally extended position to prevent the engagement of the clutch bands with the V-groove.

It will be appreciated that there are many uses for the clutch means illustrated in FIGS. 8 and 9. One such use is to prevent clutching action until the pumps in the transmission are running.

It should now be apparent that this invention is directed to a novel engagement prevention means for use in overrunning type clutches that selectively permits the interruption of prevention of frictional driving engagement of the clutch bands with the side walls of the V-groove. It is to be understood that this invention is not limited to use with a plurality of clutch bands, for it would work as well with a clutch assembly using only one clutch band. A suitable single clutch band construction for this purpose is described in our U.S. Pat. No. 3,275,111.

The scope of this invention is not limited to the four disclosed embodiments. For example, the clutch bands could be selectively moved away from driving engagement with the V-groove by encircling the clutch assembly housing made of a non-magnetic material with an electro-magnet, which when energized would pull the clutch band in a radial outward direction of sufficient distance to prevent their driving engagement.

It will be further apparent that modifications and variations may be made in the clutch band configuration of the four embodiments and in the clutch means without departing from the scope and spirit of the present invention. It is accordingly our intention that the scope of the invention be limited solely by the hereinafter appended claims.

We claim as our invention:

1. An improvement in an overrunning clutch having a drive clutch member and a driven clutch member coaxially disposed with respect of the drive clutch member, one of said clutch members being provided with a circumferentially extending V-groove, and a torque transmitting band disposed between said clutch members and having one end lying in said V-groove of said one clutch member and the other end anchored to said other clutch member, the improvement comprising engagement prevention means for selectively moving said one end of said band away from frictional driving engagement with the side walls of said V-groove, said engagement prevention means comprising a plurality of radially extending openings formed inwardly of the bottom wall of said V-groove, pressure means to selectively direct a radial outward force from said opening of sufficient magnitude to hold said clutch band away from frictional driving engagement with said walls, wherein said pressure means comprises an axial passageway portion between each of said radial openings and one end of wall of said one member, a fluid pressure chamber interconnecting said passageway portion and a pump means for applying fluid under pressure, a plunger slidably disposed in each of said radial openings and an arcuate segment secured crosswise on the outer end of each plunger and of a sufficient length to form a continuous circumferential surface when said plungers are extended on which surface said one end of said band rides to prevent it driving engagement with the side walls of said V-groove.

2. An improvement in an overrunning clutch as defined in claim 1, wherein adjacent arcuate segments are in a staggered interdigitated fashion and the end portions of adjacent segments overlap to form a continuous circumferential surface when said plungers are in the radial extended position.

3. An improvement in an overrunning clutch as defined in claim 1, wherein said pressure means further comprises a valve means for selectively discharging fluid under pressure from said pump means into said passageways to effect extension of said plungers and bleeding the fluid from said passageway to allow retraction of said plungers into said radial openings.

4. An improvement in an overrunning clutch having a drive clutch member and a driven clutch member coaxially disposed with respect to the drive clutch member, one of said clutch members being provided with a circumferentially extending V-groove, a torque transmitting band disposed between said clutch members and having one end lying in said V-groove of said one clutch member and the other end lying in said V-groove of said one clutch member and the other end anchored to said other clutch member, the improvement comprising engagement prevention means for selectively moving said one end of said band away from frictional driving engagement with said side walls of said V-groove, said engagement prevention means comprising a plurality of radially extending openings formed inwardly of the bottom wall of said V-groove and pressure means to selectively direct a radial outward force from said openings of sufficient magnitude to hold said clutch band away from frictional driving engagement with said side walls, wherein said pressure means comprising an axial passageway portion between each of said radial openings and one end wall of said one member, a plunger slidably disposed in each of said radial openings and an arcuate segment secured crosswise on the outward end of each plunger and of a sufficient length to form a continuous circular surface when said plungers are in an extended position on which surface said one end of said band rides to prevent the band's engagement with the side walls of said V-groove, a cam finger slidably disposed in each of said axial passageway portions having a cam surface on its inner end and adapted to engage the inner end of one of the plungers, an actuator plate supporting said cam fingers which is carried by said one member adjacent to said one end wall and adapted to be moved axially with respect to said one member, and spring means for biasing said plate away from said one end wall, whereby when said plate is displaced towards said one end wall, said cam surfaces force said plungers radially outwardly to said extended position.

5. An improvement in an overrunning clutch having a drive clutch member and driven clutch member coaxially disposed with respect to the drive clutch member, one of said clutch members being provided with a circumferentially extending V-groove, and a torque transmitting band disposed between said clutch members and having one end lying in said V-groove of said one clutch member and the other end anchored to the other clutch member, the improvement comprising engagement prevention means normally holding said band away from frictional driving engagement with the side walls of said V-groove that is selectively actuated to said one end for making driving engagement with said V-groove, wherein said engagement prevention means comprising a plurality of passageways formed in said one member between the bottom wall of said V-groove and one of its end walls, each of the passageways having an axial portion and a radial portion, a plunger sidably disposed in each of said radial portions, spring means for urging said plungers outwardly to an extended position, an arcuate segment secured crosswise on the outer end of said plungers and of sufficient length to form a continuous circumferential surface when said plungers are extended which prevents the band from driving engagement with the side walls of said V-groove, and pressure means to selectively direct a radial inward force on each of said plungers of sufficient magnitude to retract said plungers and associated arcuate segments.

6. An improvement in an overrunning clutch as defined in claim 5, wherein adjacent arcuate segments are arranged in a staggered interdigitated fashion and the end portions of adjacent segments overlap to form a continuous circumferential surface when said plungers are in the radial extended position.

7. An improvement in an overrunning clutch as defined in claim 5, wherein said pressure means comprises a fluid pressure chamber interconnecting said axial passageway portions and a pump means for supplying fluid under pressure, valve means for selectively discharging fluid from said pump means into said axial portions to effect retraction of said plungers and bleeding the fluid from said passageway to allow the biasing force of said spring means to extend said plungers and their associated arcuate segments.

8. An improvement in an overrunning clutch as defined in claim 5, wherein said pressure means comprises a cam finger slidably disposed in each of said axial passageway portions having a cam surface adapted to engage a cooperating surface on said plungers to effect movement of said plungers between the extended and retracted positions, an actuator plate supporting said cam fingers which is carried by said one member adjacent said one end wall and adapted to be moved axially with respect to said one member and means for biasing said plate in one axial direction for maintaining said plungers and associated arcuate segments in a normally extended position.

* * * * *